US011865669B2

(12) United States Patent
Clark et al.

(10) Patent No.: US 11,865,669 B2
(45) Date of Patent: Jan. 9, 2024

(54) SYSTEM AND METHOD FOR PRE-CONDITIONING PNEUMATIC TIRES PRIOR TO MOUNTING SAME ONTO A WHEEL

(71) Applicant: Android Industries LLC, Auburn Hills, MI (US)

(72) Inventors: Barry A. Clark, Ortonville, MI (US); Donald Graham Straitiff, Howell, MI (US); David Paul Donnay, Ortonville, MI (US)

(73) Assignee: Android Industries LLC, Auburn Hills, MI (US)

( * ) Notice: Subject to any disclaimer, the term of this patent is extended or adjusted under 35 U.S.C. 154(b) by 1395 days.

(21) Appl. No.: 16/228,408

(22) Filed: Dec. 20, 2018

(65) Prior Publication Data

US 2019/0118327 A1    Apr. 25, 2019

Related U.S. Application Data

(63) Continuation of application No. 15/287,312, filed on Oct. 6, 2016, now Pat. No. 10,160,084.

(Continued)

(51) Int. Cl.
  *B24B 5/06*     (2006.01)
  *B24B 39/02*    (2006.01)
(Continued)

(52) U.S. Cl.
  CPC ............. *B24B 5/366* (2013.01); *B24B 5/08* (2013.01); *B24B 5/44* (2013.01); *B24B 27/0076* (2013.01);
(Continued)

(58) Field of Classification Search
  CPC .... B24B 5/06; B24B 5/08; B24B 5/10; B24B 5/366; B24B 5/40; B24B 5/44;
(Continued)

(56) References Cited

U.S. PATENT DOCUMENTS 3,001,334 A * 9/1961 Stiegler ................... B24B 5/366
                                              425/58.1
3,137,976 A * 6/1964 Cooper ............... B29D 30/0633
                                              451/254

(Continued)

FOREIGN PATENT DOCUMENTS

CN    101277831 A    10/2008
JP    H04193529 A    7/1992

OTHER PUBLICATIONS

International Search Report for Application No. PCT/US2016/055710 dated Dec. 29, 2016.

*Primary Examiner* — Eileen P Morgan
(74) *Attorney, Agent, or Firm* — Miller Johnson

(57) ABSTRACT

A tire pre-conditioning system includes a first mandrel, a second mandrel spaced apart from the first mandrel, and a controller in communication with the first mandrel and the second mandrel. The first mandrel is fixedly attached to a first shaft and including a first tapered sidewall. The second mandrel is fixedly attached to a second shaft and including a second tapered sidewall. The controller is operable to axially move the first mandrel and the second mandrel toward one another until the first and second tapered sidewalls are opposing respective beads of a tire, and supply pressurized fluid into an internal cavity of the tire to inflate the tire. The inflating causing the beads to move relative to mandrels while contacting the opposing respective tapered sidewalls to burnish the beads of the tire.

24 Claims, 14 Drawing Sheets

Related U.S. Application Data

(60) Provisional application No. 62/237,958, filed on Oct. 6, 2015.

(51) Int. Cl.
| | | |
|---|---|---|
| *B24B 5/40* | (2006.01) | |
| *B24B 5/36* | (2006.01) | |
| *B24B 5/44* | (2006.01) | |
| *B24B 5/08* | (2006.01) | |
| *B24D 5/02* | (2006.01) | |
| *B24B 27/00* | (2006.01) | |
| *B29D 30/00* | (2006.01) | |

(52) U.S. Cl.
CPC ............... *B24B 39/02* (2013.01); *B24D 5/02* (2013.01); *B29D 30/0061* (2013.01); *B24B 5/40* (2013.01)

(58) Field of Classification Search
CPC ....... B24B 7/17; B24B 27/0076; B24B 39/02; B24D 5/02; B24D 5/10; B29D 30/0061
USPC .............. 451/51, 52, 54, 180, 190, 194, 920
See application file for complete search history.

(56) References Cited

U.S. PATENT DOCUMENTS

| | | | |
|---|---|---|---|
| 3,521,408 A * | 7/1970 | Neugebauer | B24B 5/366 451/457 |
| 3,848,368 A * | 11/1974 | Toshioka | B24B 5/366 451/24 |
| 3,977,131 A * | 8/1976 | Searle | G01M 1/34 451/247 |
| 6,726,289 B2 | 4/2004 | Yukawa et al. | |
| 2010/0038016 A1 | 2/2010 | Mancini | |
| 2013/0306243 A1 | 11/2013 | Mancini | |

* cited by examiner

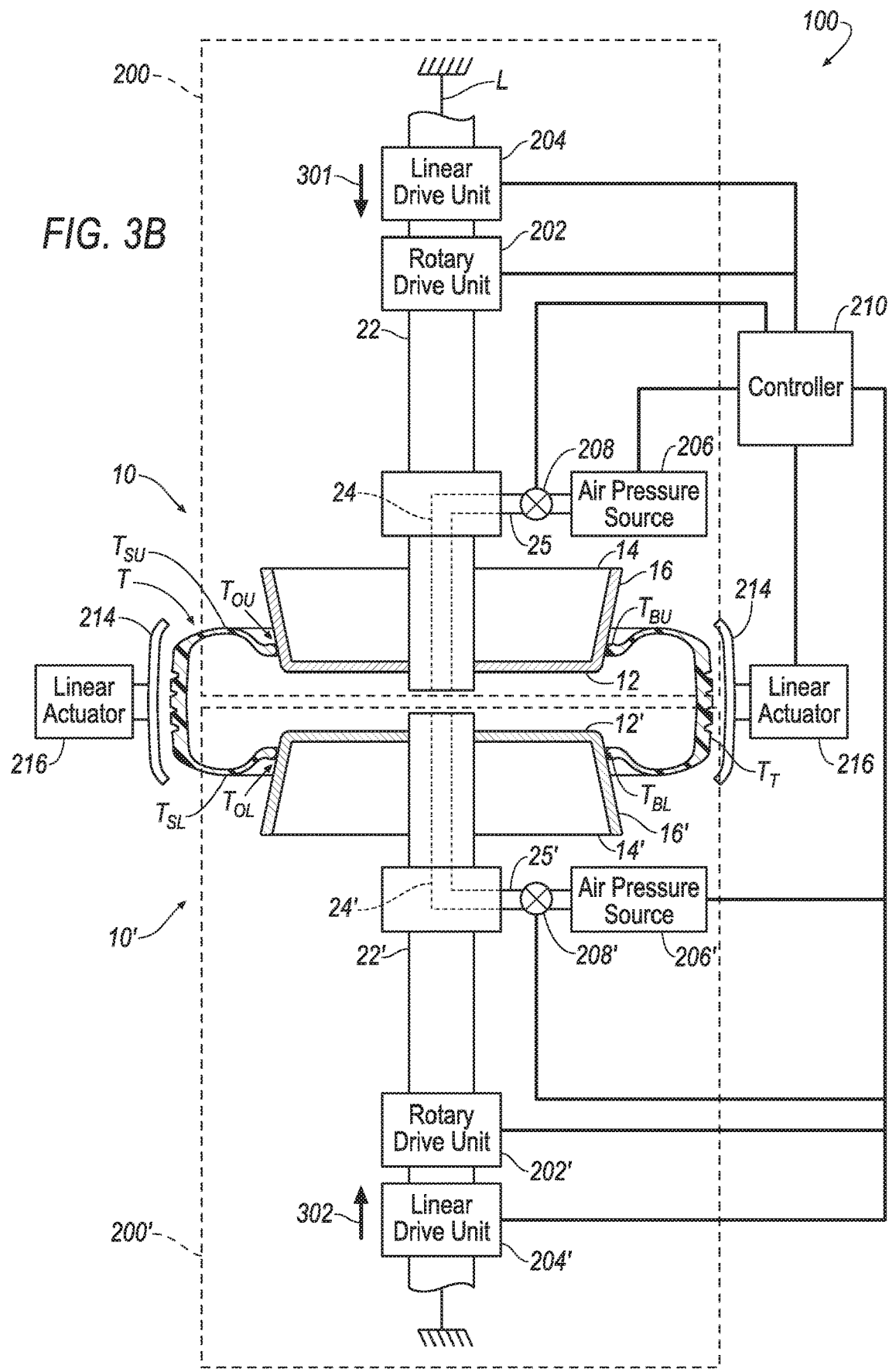

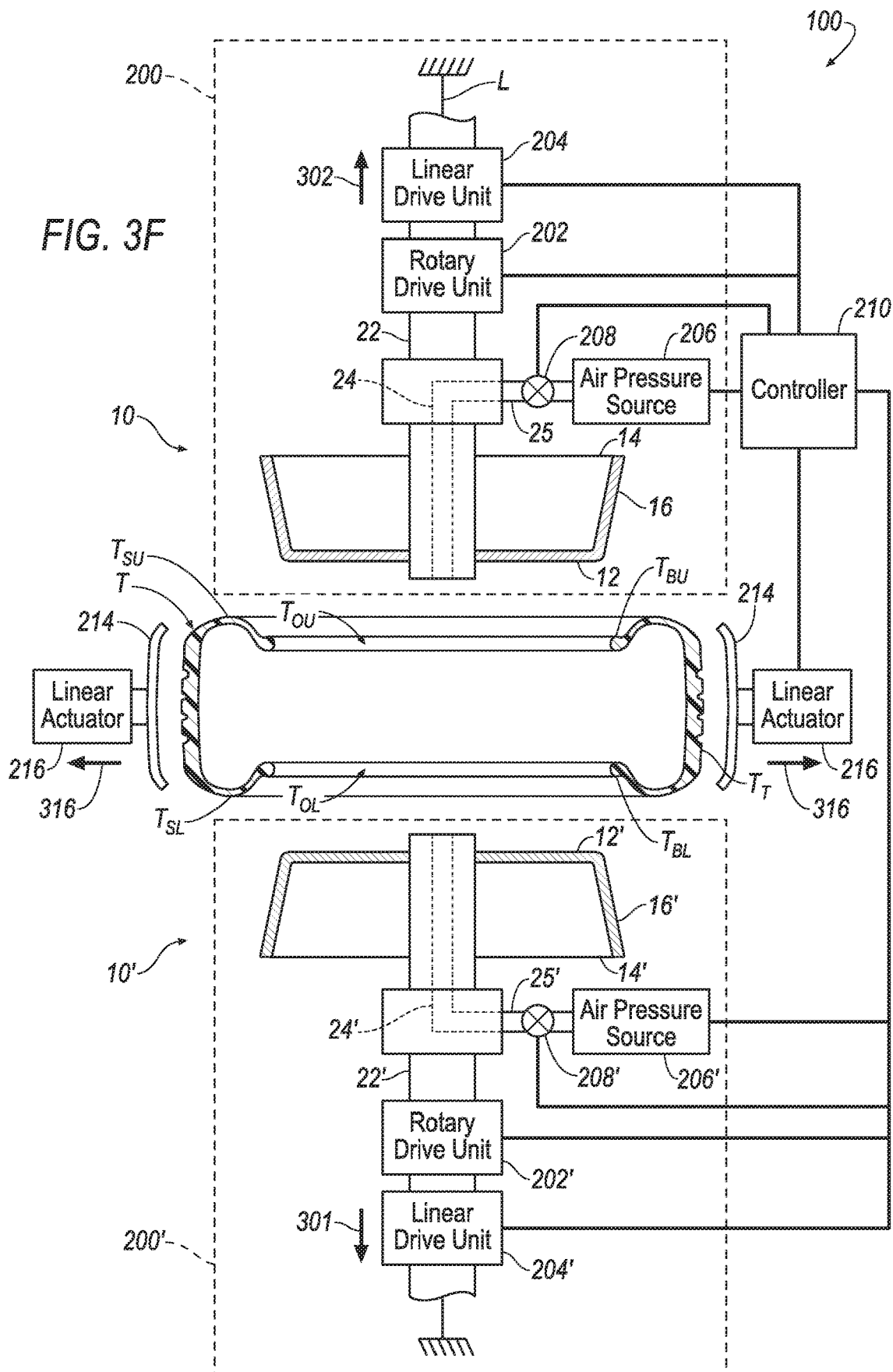

SYSTEM AND METHOD FOR PRE-CONDITIONING PNEUMATIC TIRES PRIOR TO MOUNTING SAME ONTO A WHEEL

CROSS-REFERENCE TO RELATED APPLICATIONS

This U.S. patent application is a Continuation of U.S. Pat. No. 10,160,084, Issued Dec. 25, 2018 which claims the benefit of U.S. Provisional Application 62/237,958 filed on Oct. 6, 2015, which is entirely incorporated herein by reference. The entire contents of these applications are incorporated herein by reference in their entirety.

TECHNICAL FIELD

This disclosure relates to pre-conditioning pneumatic tires, and more particular to a system and method for pre-conditioning a pneumatic tire prior to mounting the tire onto a wheel.

BACKGROUND

Wheel-tire assemblies support vehicles upon a ground surface and permit vehicles to move relative to the ground surface when the wheel-tire assemblies rotate. Pneumatic tires forming these wheel tire-assemblies are associated with inherent structural non-uniformities that may cause objectionable vibrations throughout the vehicle. To provide uniformity to a tire prior to mounting the tire onto a wheel, it is known, to burnish the beads of the tire, remove small pieces of mold flash and other surface anomalies from the tire, and generally condition an interface surface of the tire so that the tire may effectively seat onto the corresponding wheel.

SUMMARY

One aspect of the disclosure provides a tire pre-conditioning system including a first mandrel, a second mandrel axially spaced apart from the first mandrel, and a controller in communication with the first mandrel and the second mandrel. The first mandrel is fixedly attached to a first shaft for common rotation about a longitudinal axis. The first mandrel includes a first tapered sidewall. The second mandrel is fixedly attached to a second shaft for common rotation about the longitudinal axis. The second mandrel includes a second tapered sidewall. The controller is operable to axially move the first mandrel and the second mandrel toward one another until the first tapered sidewall of the first mandrel is in opposed contact with a first bead of a tire and the second tapered sidewall of the second mandrel is in opposed contact with a second bead of the tire. The tire is disposed between the first mandrel and the second mandrel and coaxial with the longitudinal axis. The controller is also operable to rotate the first mandrel and the second mandrel about the longitudinal axis relative to the tire to cause the first tapered sidewall to burnish the first bead of the tire and the second tapered sidewall to burnish the second bead of the tire.

Another aspect of the present disclosure provides a tire pre-conditioning system including a first mandrel fixedly attached to a first shaft and a second mandrel axially spaced apart from the first shaft and fixedly attached to a second shaft. The first mandrel includes a first tapered sidewall and the second mandrel includes a second tapered sidewall. A controller in communication with the first mandrel and the second mandrel is operable to axially move the first mandrel and the second mandrel toward one another until the first tapered sidewall of the first mandrel is opposing a first bead of a tire and the second tapered sidewall of the second mandrel is opposing a second bead of the tire. The tire is disposed between the first mandrel and the second mandrel and coaxial with a longitudinal axis defined by the first shaft and the second shaft. The controller is further configured to supply pressurized fluid into an internal cavity of the tire to inflate the tire. The inflating of the tire causes the first bead to move relative to the first mandrel while contacting the first tapered sidewall to burnish the first bead of the tire, and the second bead to move relative to the second mandrel while contacting the second tapered sidewall to burnish the second bead of the tire.

Implementations of the disclosure may include one or more of the following optional features. In some implementations, the system includes a first linear actuator and a first rotary drive unit each in communication with the controller and the first shaft, and a second linear actuator and a second rotary drive unit each in communication with the controller and the second shaft. In these implementations, the first linear actuator is configured to axially move the first shaft in a first direction toward the second shaft and a second direction away from the second shaft, and the second linear actuator is configured to axially move the second shaft in the direction toward the first shaft and the first direction away from the first shaft. In these implementations, the first rotary drive unit is configured to rotate the first shaft about the longitudinal axis and the second rotary drive unit is configured to rotate the second shaft about the longitudinal axis.

In some examples, the system further includes a first air pressure source in communication with the controller and configured to supply pressurized fluid to an internal cavity of the tire to inflate the tire when the first tapered sidewall is in opposed contact with the first bead and the second tapered sidewall is in opposed contact with the second bead. The first shaft may define a first slip sleeve configured to direct the pressurized air from the first air pressure source to the internal cavity of the tire. In some configurations, the system further includes a second air pressure source in communication with the controller and configured to pressurized fluid to the internal cavity of the tire to inflate the tire when the first tapered sidewall is in opposed contact with the first bead and the second tapered sidewall is in opposed contact with the second bead. In these configurations, the first and second air pressure sources supply the pressurized fluid to the internal cavity concurrently. The second shaft may define a second slip sleeve configured to direct the pressurized air from the second air pressure source to the internal cavity of the tire.

At least a portion of the first tapered sidewall and the second tapered sidewall may include abrasive materials that may be impregnated within the first tapered sidewall and the second tapered sidewall. Additionally or alternatively, an exterior surface of at least one of the first tapered sidewall or the second tapered sidewall is roughened. IN some examples, at least one of the first tapered sidewall or the second tapered sidewall includes a circumferential burnishing region defined by a series of apertures formed through the at least one of the first tapered sidewall or the second tapered sidewall. In these examples, one or more of the apertures may be defined by cambered walls configured to shave off excess tire material. In some implementations, a circumferential axial stop radially protrudes from at least one of the first tapered sidewall or the second tapered sidewall. The axial stop is configured to limit axial movement of the tire when the first tapered sidewall is in opposed contact with the first bead of the tire and the second tapered sidewall of the second mandrel is in opposed contact with the second bead of the tire.

Another aspect of the disclosure provides a method of pre-conditioning a pneumatic tire. The method includes positioning the tire in a tire vice between a first mandrel and a second mandrel axially spaced apart from the first mandrel. The first mandrel and the second mandrel are each fixedly attached to a respective shaft for common rotation about a longitudinal axis. The method further includes axially moving the first mandrel and the second mandrel toward one another in opposite directions until a first tapered surface of the first mandrel is in opposed contact with a circumferential first bead of the tire and a second tapered sidewall of the second mandrel is in opposed contact with a circumferential second bead of the tire. When the first tapered surface is in opposed contact with the first bead and the second tapered sidewall is in opposed contact with the second bead, the method includes rotating the first mandrel and the second mandrel about the longitudinal axis relative to the tire to remove excess tire material from the first bead and the second bead, axially moving the first mandrel and the second mandrel away from one another, and removing the tire from the tire vice.

Another aspect of the present disclosure provides a method of pre-conditioning a pneumatic tire. The method includes positioning the tire in a tire vice between a first mandrel and a second mandrel axially spaced apart from the first mandrel. The first mandrel and the second mandrel are each fixedly attached to a respective shaft defining a longitudinal axis. The method further includes axially moving the first mandrel and the second mandrel toward one another in opposite directions until a first tapered surface of the first mandrel is opposing a circumferential first bead of the tire and a second tapered sidewall of the second mandrel is opposing a circumferential second bead of the tire. When the first tapered surface is opposing the first bead and the second tapered sidewall is opposing the second bead, the method includes inflating the tire by providing pressurized fluid from an air pressure source in fluid communication with an internal cavity of the tire via a slip sleeve defined by the first shaft or the second shaft. The inflating of the tire removes excess tire material from the first bead and the second bead as the first bead moves relative to the first mandrel while in contact with the first tapered surface and the second bead moves relative to the second mandrel while in contact with the second tapered surface.

This aspect may include one or more of the following optional features. In some implementations, the circumferential first bead and the circumferential second bead of the tire each define a respective tire opening coaxial with the longitudinal axis when the tire is positioned in the tire vice between the first mandrel and the second mandrel. Positioning the tire in the tire vice may include positioning an uninflated tire in the tire vice.

In some examples, prior to rotating the first mandrel and the second mandrel about the longitudinal axis, the method further includes inflating the tire by providing pressurized fluid from an air pressure source in fluid communication with an internal cavity of the tire via a slip sleeve defined by the first shaft. Moreover, prior to axially moving the first mandrel and the second mandrel away from one another, the method may include deflating the tire by opening an air release valve disposed in an air conduit fluidly connecting the air pressure source and the slip sleeve.

The exterior surfaces of the first tapered sidewall and the second tapered sidewall may be at least one of roughened or comprise abrasive materials. In some examples, at least one of the first tapered sidewall or the second tapered sidewall defines a circumferential burnishing region defined by a series of apertures. Additionally or alternatively, at least one of the first tapered sidewall or the second tapered sidewall may include a circumferential axial stop that protrudes radially outward from the at least one of the first tapered sidewall or the second tapered sidewall.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 3B is an isometric cross-sectional view of the tire pre-conditioning system of FIG. 3A showing the tapered mandrels axially moved against beads of the tire.

FIG. 3F is an isometric cross-sectional view of the tire pre-conditioning system of FIG. 3A showing the tapered mandrels axially moving in opposite directions away from the tire.

Like reference symbols in the various drawings indicate like elements.

DETAILED DESCRIPTION

Figure 1:
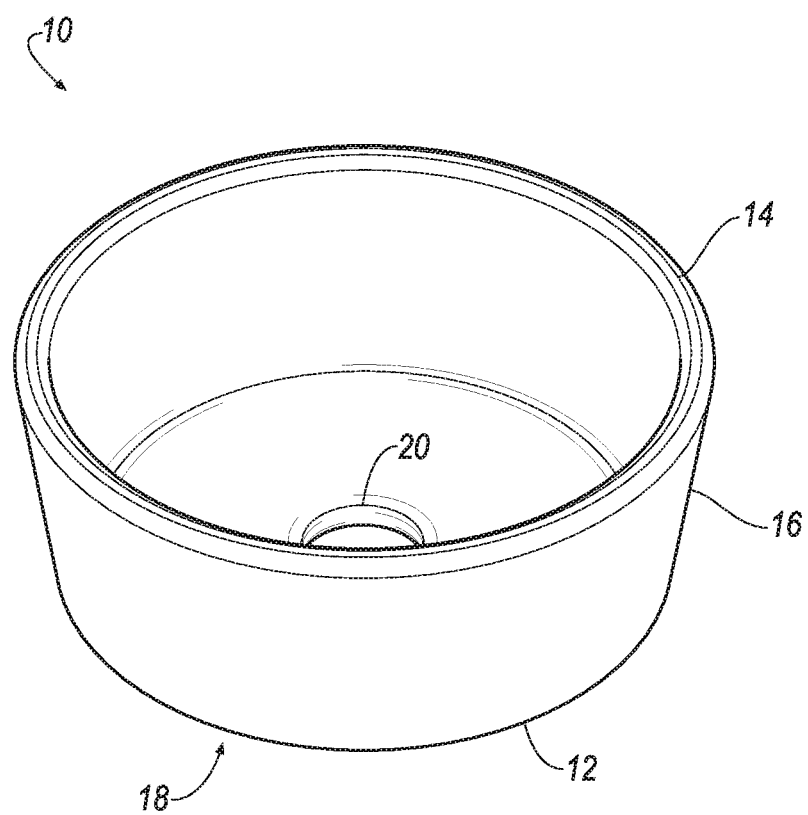
FIG. 1 is an isometric view of an example tapered mandrel having a leading edge defined by a first radius, a trailing edge defined by a second radius greater than the first radius, and a tapered sidewall interconnecting the leading and trailing edges.
Figure 2A:
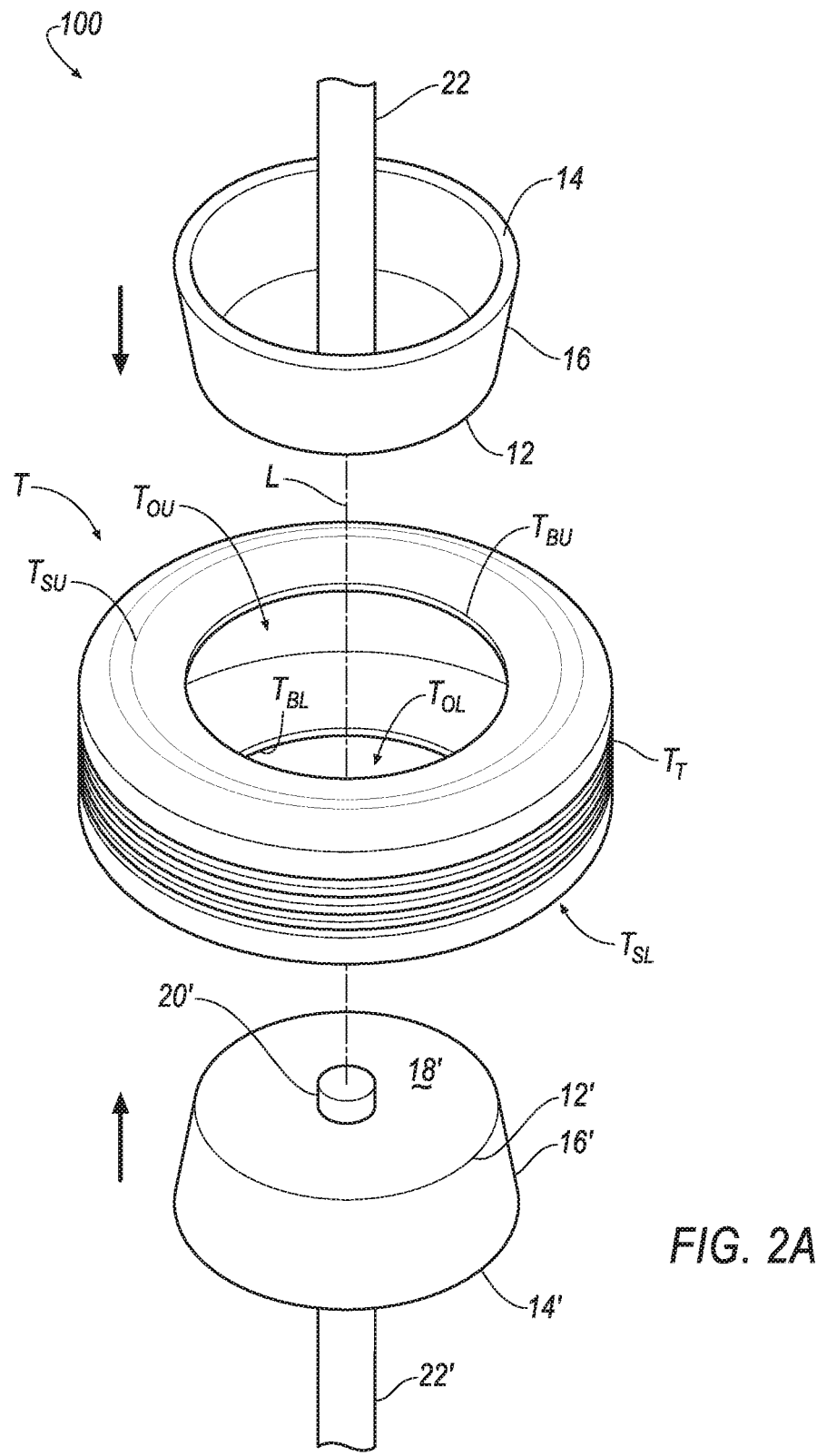
FIG. 2A is an isometric view of an example tire pre-conditioning system including a pair of tapered mandrels axially spaced apart from one another and configured to move axially toward a central opening of a tire disposed axially between the tapered mandrels.

Referring to FIG. 1, in some implementations, a mandrel 10 for a tire pre-conditioning system 100 (FIGS. 2A and 2B) includes a leading edge 12 having a first radius, a trailing edge 14 having a second radius greater than the first radius, and a tapered sidewall 16 interconnecting the leading edge 12 and the trailing edge 14. Accordingly, the mandrel 10 may define a conical or frusto-conical shape. The mandrel 10 may include a leading surface 18 having an outer periphery defined by the leading edge 12 and defining a shaft opening 20 for fixedly mounting the mandrel 10 to a rotatable shaft 22 (FIG. 2A). The tapered sidewall 16, or portion thereof, may be associated with a specific roughness and/or geometry for optimally burnishing a bead $T_{BL}$, $T_{BU}$ (FIGS. 2A and 2B) of a tire T in contact therewith when the mandrel 10 rotates relative to the tire T while contacting the bead surface $T_{BL}$, $T_{BU}$. A pair of mandrels 10, 10' (FIGS. 2A and 2B) may cooperate to burnish respective ones of a circumferential upper bead $T_{BU}$ and a circumferential lower bead $T_{BL}$ of the tire T when each of the mandrels 10, 10' rotate relative to the tire while contacting the beads $T_{BL}$, $T_{BU}$.

A used herein, the terms "upper", "lower", "left", "right", and "side" may reference an exemplary tire T and/or components of a tire-preconditioning system 100; although such nomenclature may be utilized to describe a particular portion or aspect of the tire T or system 100, such nomenclature may be adopted due to the orientation of the tire T with respect to the system 100. Accordingly, the above nomenclature should not be utilized to limit the scope of the claimed invention and is utilized herein for exemplary purposes in describing implementations of the present disclosure.

Figure 2B:
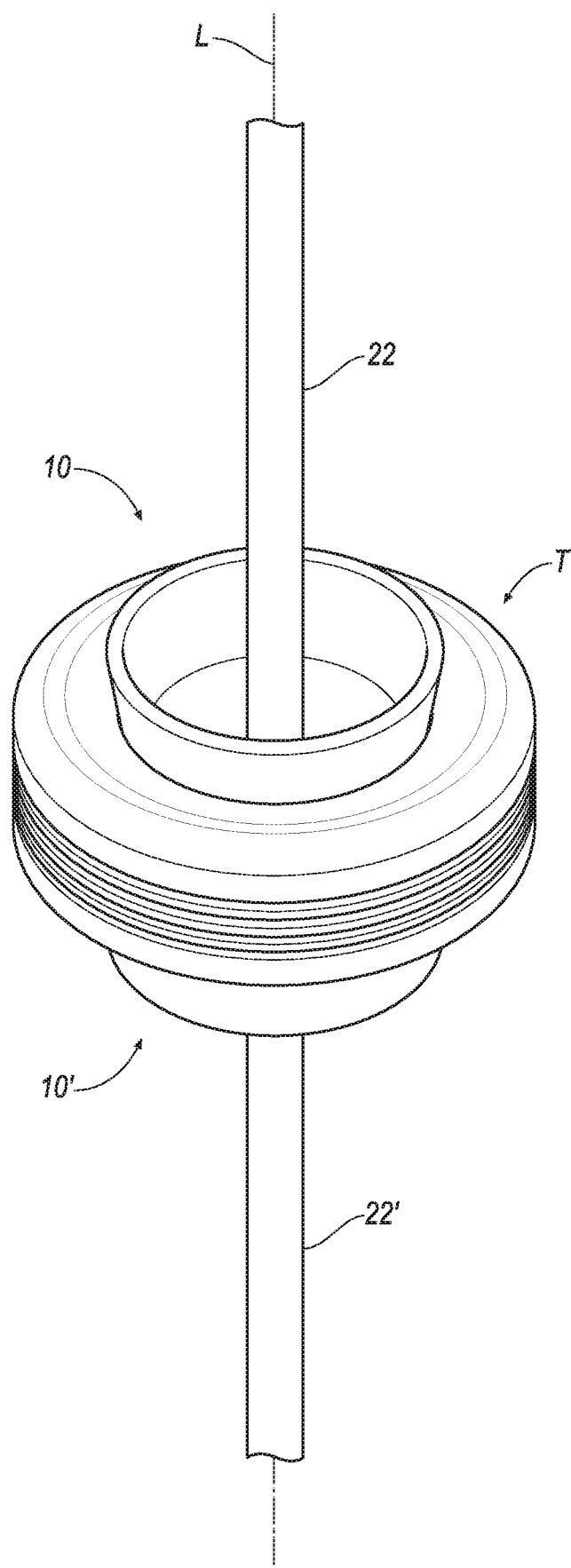
FIG. 2B is an isometric view of the tire pre-conditioning system of FIG. 2A showing the pair of tapered mandrels axially moved against beads of the tire.

FIGS. 2A and 2B provide a tire pre-conditioning system 100 for burnishing beads $T_{BL}$, $T_{BU}$ of a pneumatic tire T. The tire pre-conditioning system 100 includes an upper mandrel 10 and a lower mandrel 10' axially aligned with one another and fixed to a respective shaft 22, 22' for common rotation about a longitudinal axis L. A portion of each shaft 22, 22' may extend through the respective opening 20, 20' and define a slip sleeve 24, 24' (FIG. 3A) for directing pressurized air to inflate the tire T. Slip sleeve 24, 24' (also known as a slip coupling) is effective for transferring pressurized air from conduit 25, 25' into the tire to inflate the tire even when shaft 22, 22' rotates. The mandrels 10, 10a each include the leading edge 12, 12', the trailing edge 14, 14', and the tapered sidewall 16, 16' interconnecting the leading edge 12, 12' and the trailing edge 14, 14'. In some examples, the first radius associated with each leading edge 12, 12' is substantially the same, while in other examples, the first radius associated with the leading edge 12 of the upper mandrel 10 is different than the first radius associated with the leading edge 12' of the lower mandrel 10'. Additionally or alternatively, the second radius associated with the trailing edge 14 of the upper mandrel 10 and the second radius associated with the trailing edge 14' of the lower mandrel 10' may be the same or different. Thus, the length and/or slope of the tapered sidewalls 16, 16' may be the same or different.

The tire T includes an upper sidewall $T_{SU}$, a lower sidewall $T_{SL}$, and a thread surface $T_T$ joining the upper sidewall $T_{SU}$ to the lower sidewall $T_{SL}$. The upper sidewall $T_{SU}$ may rise away from the tread surface $T_T$ to a peak and subsequently descend at a slope to terminate at and form the circumferential upper bead, $T_{BU}$; similarly, the lower sidewall $T_{SL}$ may rise away from the tread surface $T_T$ to a peak and subsequently descend at a slope to terminate at and form the circumferential lower bead $T_{BL}$. The upper bead $T_{BU}$ may form a circular, upper tire opening $T_{OU}$, while the lower bead $T_{BL}$ may form a circular, lower tire opening $T_{OL}$.

FIG. 2A shows the mandrels 10, 10' axially spaced apart from one another such that the openings 20, 20' are coaxial with the longitudinal axis L and the shafts 22, 22' are substantially collinear with the longitudinal axis L. The tire T is disposed between the pair of mandrels 10, 10' such that the upper and lower tire opening $T_{OU}$, $T_{OL}$ are coaxial with the longitudinal axis L. In some examples, the mandrels 10, 10' are configured to move axially toward one another in opposite directions. For instance, the upper mandrel 10 may move axially downward until the leading edge 12 passes through the upper tire opening $T_{OU}$ and the sidewall 16 is in opposed contact with the upper bead $T_{BU}$. Similarly, the lower mandrel 10' may move axially upward until the leading edge 12' passes through the lower tire opening $T_{OL}$ and the sidewall 16' is in opposed contact with the lower bead $T_{BL}$.

FIG. 2B shows the pair of frusto-conical mandrels 10, 10' each axially moved toward one another such that the exterior of each sidewall 16, 16' is in opposed contact with the respective bead $T_{BU}$, $T_{BL}$ of the tire T. The leading edges 12, 12' may be axially spaced apart from one another or may touch. A distal end of each shaft 22, 22' may be substantially flush with the respective leading edge 12, 12' or may axially extend thru the respective opening 22, 22' and away from the respective leading edge 12, 12'. FIG. 2B shows the tire in an un-inflated state and the exterior surfaces of the sidewalls 16, 16' each simulating a bead seat surface of a road wheel. Accordingly, the axial movement of the mandrels 10, 10' into contact with the beads $T_{BU}$, $T_{BL}$ of the tire T simulates the mounting of the uninflated tire T onto a road vehicle wheel. In some implementations, one or both of the shafts 22, 22' defines the slip sleeve 24, 24' (FIGS. 3A-3F) for directing pressurized air into a circumferential air cavity $T_{AC}$ (FIGS. 3A-3F) of the tire T for inflating the tire T. The tire T may be inflated to a pressure that provides sufficient tension between each circumferential bead $T_{BU}$, $T_{BL}$ of the tire T and the respective mandrel 10, 10' in contact therewith. In some examples, a portion of at least one of the sidewalls 16, 16' may be roughened and/or include abrasive materials to help facilitate the burnishing of the beads $T_{BU}$, $T_{BL}$ of the tire T. Additionally or alternatively, at least one of the sidewalls 16, 16' may include an axial stop 616 (FIGS. 6 and 7) that protrudes radially outward for limiting axial movement of the tire T when the mandrels 10, 10' move toward one another and the tire T is inflated. Once inflated, the mandrels 10, 10' may rotate about the longitudinal axis L relative to the tire T to cause the exterior of each tapered sidewall 16, 16' to burnish excess material from the beads $T_{BU}$, $T_{BL}$ of the tire T in contact therewith.

FIGS. 3A-3F provide isometric cross-sectional views of the tire pre-conditioning system 100 for burnishing/removing excess material from upper and lower beads $T_{BU}$, $T_{BL}$ of the tire T prior to mounting the tire T onto a vehicle wheel. The system 100 includes the pair of mandrels 10, 10' axially opposing one another and fixed for common rotation with respective shafts 22, 22', and the tire T disposed between the mandrels 10, 10'. More specifically, the system 100 may include an upper portion 200 associated with the upper mandrel 10 and a lower portion 200' associated with the lower mandrel 10'. In some configurations, the upper portion 200 includes the following components: the upper mandrel 10, an upper rotary drive unit 202, an upper linear drive unit 204, an upper air pressure source 206, and an upper relief valve 208. Similarly, the lower portion 200' may include the following components: the lower mandrel 10', a lower rotary drive unit 202', a lower linear drive unit 204', a lower air pressure source 206', and a lower relief valve 208'. Linear drive unit 204, 204' can be any type of linear drive mechanisms including hydraulically, electrically, or pneumatically powered mechanism that effectuate linear motion. In some examples, the upper and lower air pressure sources 206, 206' are associated with a single air pressure source. Air pressure source 206, 206' can include any number of mechanisms used to generate pressurized air including electrically, pneumatically, or hydraulically powered air pressure generating mechanisms. The system 100 includes a controller 210 in communication with each of the components 202-208 of the upper portion 200 and each of the components 202'-208' of the lower portion 200'. Controller 210 can be any type of controller used to control industrial processes such as an electronic controller (digital, microprocessor, or analog).

In some implementations, each shaft 22, 22' defines a respective slip sleeve 24, 24' for directing pressurized fluid therethrough. For instance, the slip sleeve 24 of the upper shaft 22 is in fluid communication with the upper air pressure source 206 via an upper air conduit 25, while the slip sleeve 24' of the lower shaft 22' is in fluid communication with the lower air pressure source 206' via a lower air conduit 25'. In some examples, each relief valve 208, 208' is disposed within the respective air conduit 25, 25' and operative between a closed state for retaining pressurized fluid 306 (FIG. 3C) within the respective conduit 25, 25' and an open state for releasing pressurized fluid 306 out of the respective conduit 25, 25'. The controller 210 may control each of the valves 208, 208' between the open and closed states. Moreover, the controller 210 may control the air pressure source 206, 206 for supplying pressurized air through the respective slip sleeve 24, 24'.

The system 100 may also include a tire vice 214 configured to support the tire T between the pair of mandrels 10, 10'. Specifically, the tire vice 214 may enclose the tread $T_T$ of the tire T and a portion of the upper and lower sidewalls $T_{SU}$, $T_{SL}$. A linear actuator 216 in communication with the controller 210 may move the tire vice 214 radially inward and against the sidewalls $T_{SU}$, $T_{SL}$ to retain the tire T in a stable position such that the lower tire opening $T_{OL}$ and the upper tire opening $T_{OU}$ are both coaxial with the longitudinal axis L. Linear actuator 216 can be any type of linear actuator mechanisms including hydraulically, electrically, or pneumatically powered mechanisms that effectuate linear motion. As will become apparent, the tire vice 214 also limits radial expansion of the tire T when the tire T is inflated. Moreover, the linear actuator 216 may control the tire vice 214 to maintain a desirable degree of tension between the beads $T_{BL}$, $T_{BU}$ and the sidewalls 16, 16' of each respective mandrel 10, 10'.

Figure 3A:
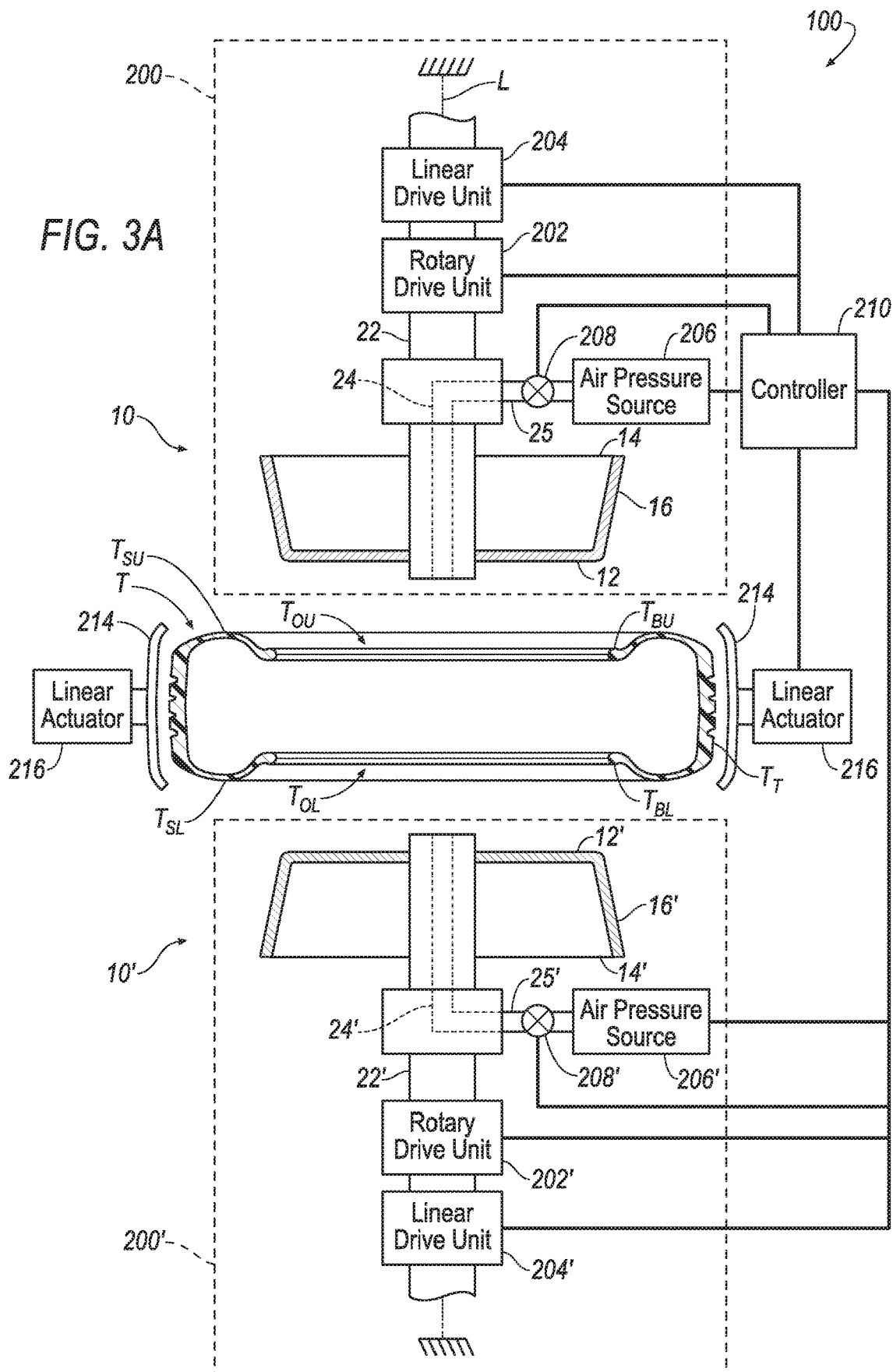
FIG. 3A is an isometric cross-sectional view of an example tire pre-conditioning system including a pair of tapered mandrels axially spaced apart from one another and a pneumatic tire disposed between the tapered mandrels.

FIG. 3A shows the upper mandrel 10 and the lower mandrel 10' axially spaced apart from one another such that the openings 20, 20' are coaxial with the longitudinal axis L and the shafts 22, 22' are substantially collinear with the longitudinal axis L. The tire T is disposed between the pair of mandrels 10, 10' such that the upper and lower tire opening $T_{OU}$, $T_{OL}$ are coaxial with the longitudinal axis L. In some examples, the mandrels 10, 10' are configured to move axially toward one another in opposite directions.

FIG. 3B shows the upper linear drive unit 204 axially moving the upper shaft 22 and upper mandrel 10 fixedly attached thereto in a first direction 301 toward the tire T underneath (e.g., relative to the view of FIG. 3B), while the lower linear drive unit 204' axially moves the lower shaft 22' and lower mandrel 10' fixedly attached thereto in an opposite second direction 302 toward the tire T above (e.g., relative to the view of FIG. 3B). Here, the controller 210 may send linear displacement signals to each of the linear drive units 204, 204' that command the axial displacement of the mandrels 10, 10' toward one another. For instance, the upper mandrel 10 may move axially downward until the leading edge 12 passes through the upper tire opening $T_{OU}$ and the sidewall 16 is in opposed contact with the upper bead $T_{BU}$. Similarly, the lower mandrel 10' may move axially upward until the leading edge 12' passes through the lower tire opening $T_{OL}$ and the sidewall 16' is in opposed contact with the lower bead $T_{BL}$.

Alternatively, one or both of the mandrels 10, 10' may move in their axial directions toward the tire opening $T_{OU}$ until the sidewalls 16, 16' are opposing their respective bead $T_{BU}$, $T_{BL}$, but separated therefrom by a gap. Here, a rapid supply of pressurized fluid 306 (FIG. 3C) into the circumferential air cavity $T_{AC}$ of the tire T from one or both of the air pressure sources 206, 206' may cause the upper bead $T_{BU}$ to expand axially upward and into contact with the tapered sidewall 16, and the lower bead $T_{BL}$ to expand axially downward and into contact with the tapered sidewall 16'.

Figure 3C:
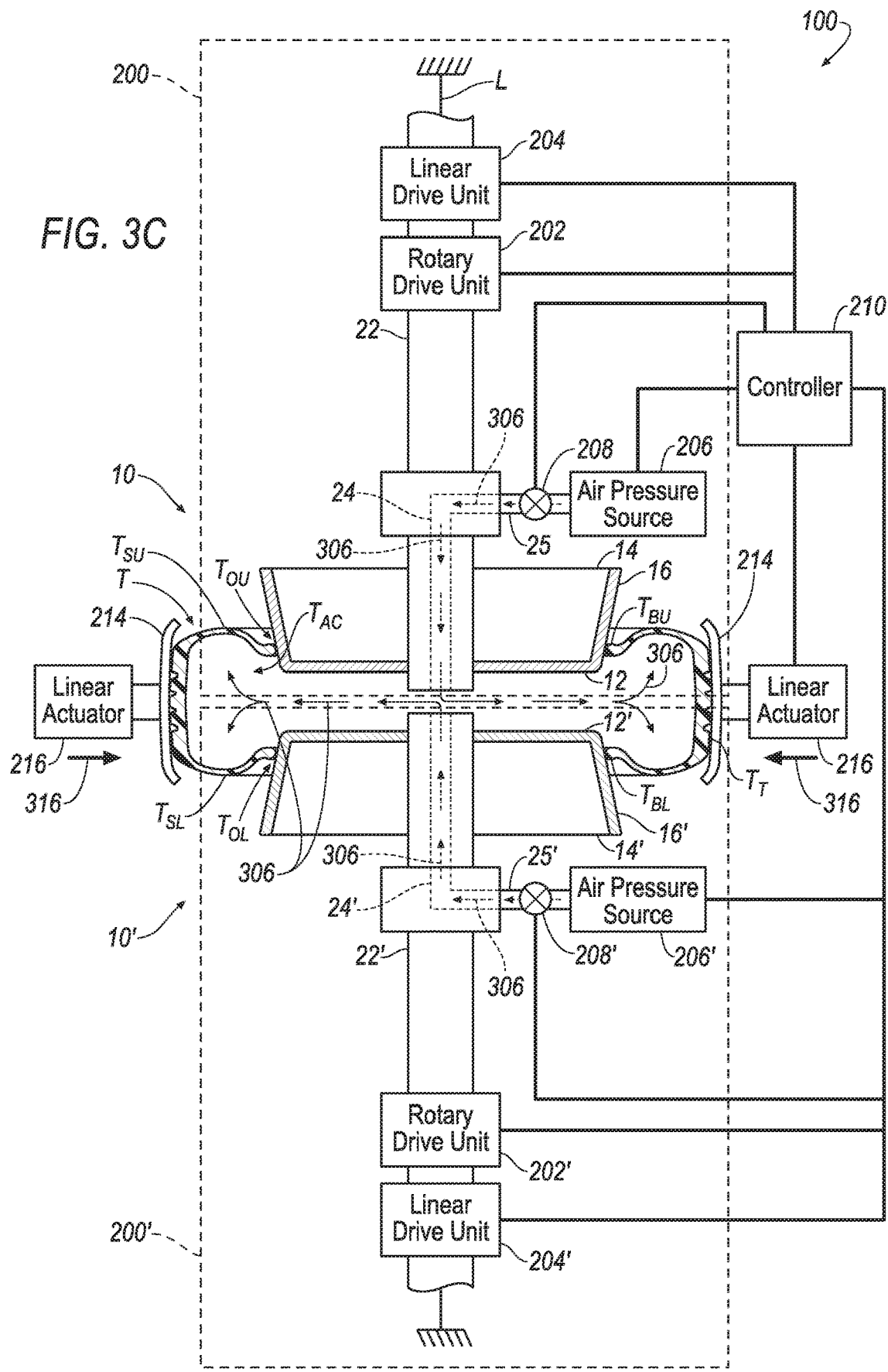
FIG. 3C is an isometric cross-sectional view of the tire pre-conditioning system of FIG. 3A showing air pressure sources supplying pressurized air into a cavity of the tire.

Referring to FIG. 3C, the tire T includes the circumferential air cavity $T_{AC}$ in fluid communication with each of the slip sleeves 24, 24' and also the air pressure sources 206, 206'. Once the upper bead $T_{BU}$ is in opposed contact with upper sidewall 16 of the upper mandrel 10 and the lower bead $T_{BL}$ is in opposed contact with the lower sidewall 16' of the lower mandrel 10', the circumferential air cavity $T_{AC}$ of the tire T is effectively sealed so that one or both of the air pressure sources 206, 206' may supply pressurized fluid 306 (e.g., air) to the circumferential air cavity $T_{AC}$ to inflate the tire T to a desired pressure. In view of the foregoing, the air pressure source(s) 206, 206' may rapidly supply the pressurized fluid 306 (e.g., air) while a gap exists between each bead $T_{BU}$, $T_{BL}$ and the corresponding opposing sidewall 16, 16', thereby causing the tire T to expand until the beads $T_{BU}$, $T_{BL}$ contact the sidewalls 16, 16' to seal the circumferential air cavity $T_{AC}$ of the tire T. In some examples, the pressurized fluid 306 is nitrogen or another gas. Additionally, the linear actuator 216 may move the tire vice 214 radially inward (e.g., in a radial direction 316 toward the tire T) to maintain tension between each bead $T_{BL}$, $T_{BU}$ and the respective sidewall 16, 16' of each mandrel 10, 10'.

In some examples, the system 100 uses both air pressure sources 206, 206' to supply the pressurized fluid 306 for decreasing the inflation time. In other examples, the system 100 only includes one of the air pressure sources 206, 206' for supplying the pressurized fluid to inflate the tire T. In some implementations, the system 100 includes both air pressure sources 206, 206' but the controller 210 opts to only supply the pressurized fluid from one of the air pressure sources 206, 206'. Each relief valve 208, 208' is in the closed state to prevent the pressurized fluid 306 from escaping out of the conduits 25, 25' when inflating the tire T with the pressurized fluid 306.

Figure 3D:
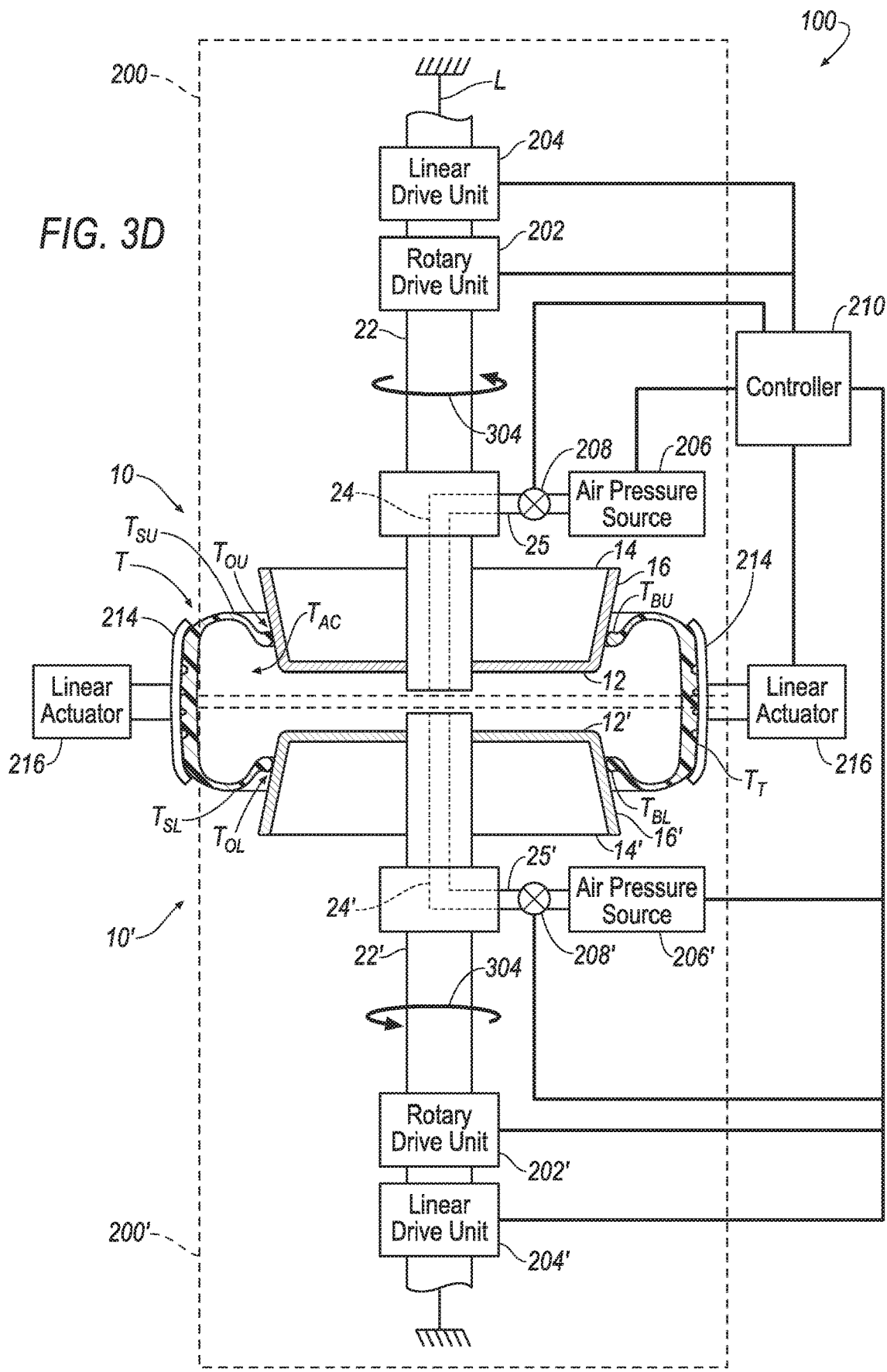
FIG. 3D is an isometric cross-sectional view of the tire pre-conditioning system of FIG. 3A showing the tapered mandrels rotating about a common axis of rotation relative to the tire to burnish the beads of the tire.

Once the tire T is inflated with the pressurized fluid 306 (e.g., air), the system 100 may burnish the tire T by rotating the mandrels 10, 10' relative to the tire T, and thereby remove excess material from the upper bead $T_{BU}$ and the lower bead $T_{BL}$ and/or roughen the surfaces of the beads $T_{BU}$, $T_{BL}$. FIG. 3D shows the upper rotary drive unit 202 rotatably moving the upper shaft 22 about the longitudinal axis L in a first rotatable direction 303 and the lower rotary drive unit 202' rotatably moving the lower shaft 22' about the longitudinal axis L in a second rotatable direction 304. The rotatable directions 303, 304 may be the same (e.g., both clockwise or both counterclockwise) or different (e.g., one clockwise and the other counter clockwise). In some configurations, the controller 210 may rotate at least one of the shafts 22, 22' one direction for a predetermined period of time and then rotate the at least one shaft 22, 22' in the opposite direction.

As the mandrels 10, 10' are fixed to the shafts 22, 22', rotation by the shafts 22, 22' causes the mandrels 10, 10' to commonly rotate and burnish the tire. Here, the upper sidewall 16 of the upper mandrel 10 removes excess material from the upper bead $T_{BU}$ when the upper mandrel 10 rotates in the first rotatable direction 303 relative to the tire T. In some examples, rotation by the upper mandrel 10 while in contact with the upper bead $T_{BU}$ is effective to roughen the surface of the upper bead $T_{BU}$ to condition the upper bead $T_{BU}$ when mounting the tire to a wheel.

Similarly, the lower sidewall 16' of the lower mandrel 10' removes excess material from the lower bead $T_{BL}$ when the upper mandrel 10' rotates in the second rotatable direction 304 relative to the tire T. In some examples, rotation by the lower mandrel 10' while in contact with the lower bead $T_{BL}$ is effective to roughen the surface of the lower bead $T_{BL}$ to condition the lower bead $T_{BL}$ when mounting the tire T to a wheel.

In the alternative (i.e., see FIG. 8), the system 100 may burnish the tire T simply due to the expansion of the tire when the pressurized air 306 is received within the air cavity $T_{AC}$ without rotating the mandrels 10, 10' relative to the tire T. Rather, the expanding tire T is moving relative to the mandrels 10, 10'. For instance, the pressurized circumferential air cavity $T_{AC}$ may cause the upper bead $T_{BU}$ to move axially upward against the sidewall 16 of the upper mandrel 10, while similarly causing the lower bead $T_{BL}$ to move axially downward against the sidewall 16' of the lower mandrel 10'. Here, the axial movement of the beads $T_{BU}$, $T_{BL}$ relative to, and in contact with, the corresponding sidewalls 16, 16' is sufficient to remove excess material from the upper bead $T_{BU}$ and the lower bead $T_{BL}$ and/or roughen the surfaces of the beads $T_{BU}$, $T_{BL}$.

Figure 3E:
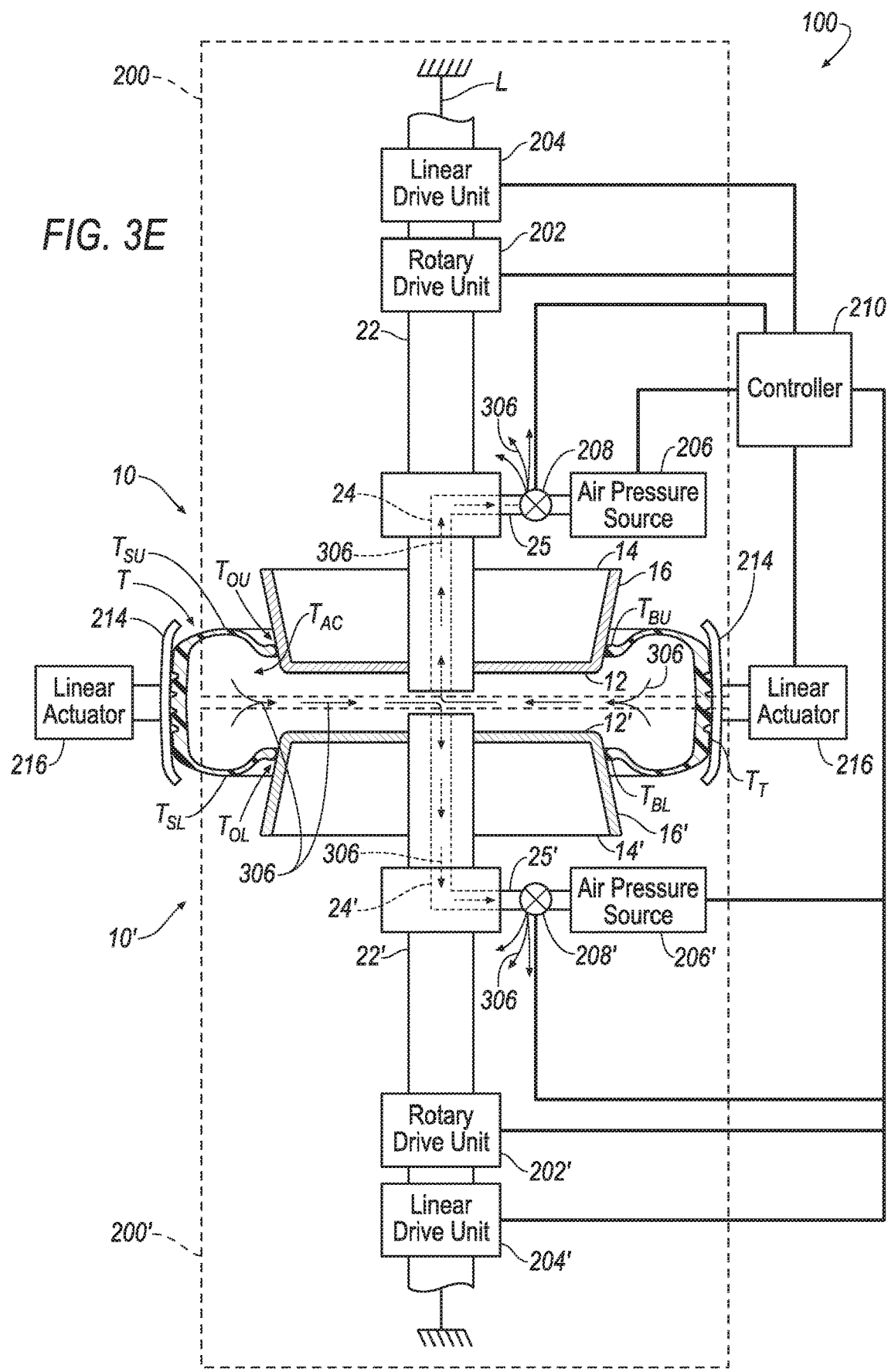
FIG. 3E is an isometric cross-sectional view of the tire pre-conditioning system of FIG. 3A showing air relief valves releasing the pressurized air from the cavity of the tire.

Referring to FIG. 3E, the controller 210 commands the rotary drive units 202, 202' to cease rotating the shafts 22, 22' and respective mandrels 10, 10' fixedly attached thereto when the burnishing process is complete. In some examples, the controller 210 sets a timer once the shafts 22, 22' commence rotation about the longitudinal axis L and commands the rotary drive units 202, 202' to cease rotating the shafts 22, 22' at the end of a predetermined burnishing time period. Accordingly, when the burnishing process is complete, the controller 210 may command the relief valves 208, 208' to transition to the open state, and thereby permit the pressurized fluid 306 (e.g., air) to release from the circumferential air cavity $T_{AC}$ via each of the respective air conduits 25, 25'. Here, the tire is deflated to release the tension between each bead $T_{BU}$, $T_{BL}$ and the respective mandrel 10, 10' so that the mandrels 10, 10' can be axially moved away from one another for removing the tire T from the system 100.

FIG. 3F shows the upper linear drive unit 204 axially moving the upper shaft 22 and upper mandrel 10 fixedly attached thereto in the second direction 302 away from the tire T underneath (e.g., relative to the view of FIG. 3F), while the lower linear drive unit 204' axially moves the lower shaft 22' and lower mandrel 10' fixedly attached thereto in the opposite first direction 301 away from the tire T above (e.g., relative to the view of FIG. 3F). Here, the controller 210 may send linear displacement signals to each of the linear drive units 204, 204' that command the axial displacement of the mandrels 10, 10' away from one another. For instance, the upper mandrel 10 may move axially upward to pull the leading edge 12 out of the air cavity $T_{AC}$ via the upper tire opening $T_{OU}$ and disengage the sidewall 16 from contact with the upper bead $T_{BU}$. Similarly, the lower mandrel 10' may move axially downward to pull the leading edge 12' out of the air cavity $T_{AC}$ via the lower tire opening $T_{OL}$ and disengage the sidewall 16' from contact with the lower bead $T_{BL}$. The controller 210 may also command the linear actuator 216 to move the tire vice 214 radially outward and away from the tread $T_T$ of the tire T so that the burnished tire T may be removed from the system 100. A new uninflated tire T requiring burnishing may then be disposed axially between the upper and lower mandrels 10, 10', inflated, burnished, deflated, and removed as described above in FIGS. 3A-3F.

While the orientation of the system 100 in FIGS. 2A-3F depicts an orientation with "upper" and "lower" portions 200, 200', respectively, the system 100 is not limited to the orientation depicted in FIGS. 2A-3F. In other configurations, the system 100 may be adapted such that the linear drive units 204, 204' move the shafts 22, 22' and mandrels 10, 10' horizontally/laterally toward one another to place the respective sidewalls 16, 16' in opposed contact with the beads $T_{BU}$, $T_{BL}$.

Figure 4A:
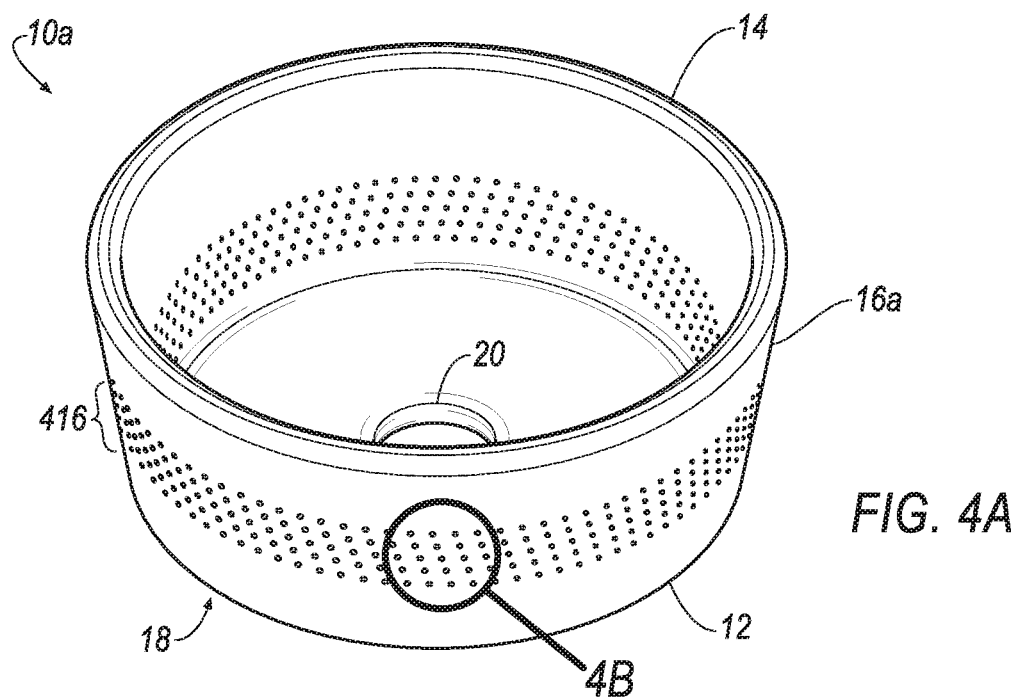
FIG. 4A is an isometric view of an example mandrel including a burnishing region extending circumferentially around a tapered sidewall surface.
Figure 4B:
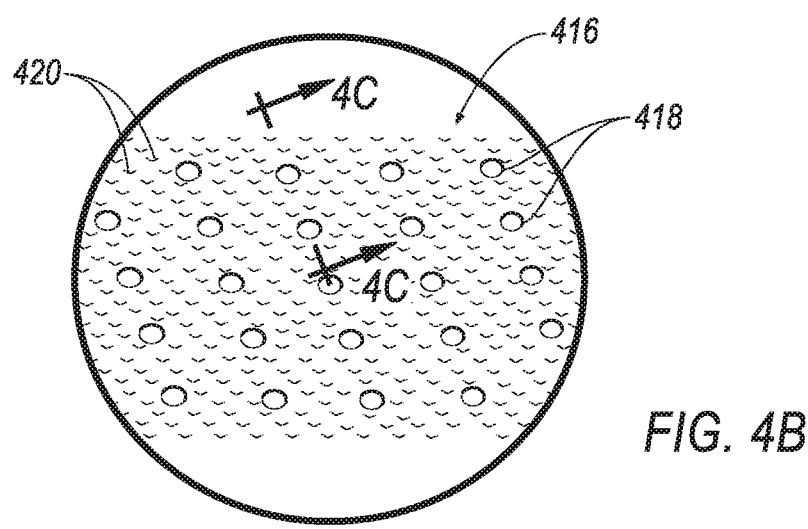
FIG. 4B is a detailed view of the burnishing region of the mandrel of FIG. 4A showing a series of apertures formed through the tapered sidewall surface to define the burnishing region.
Figure 4C:
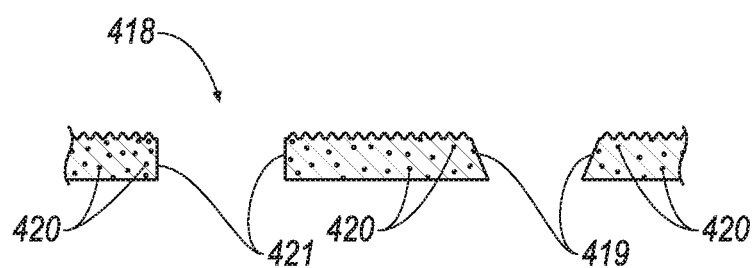
FIG. 4C is a cross-sectional view taken along line 4C-4C of FIG. 4B showing abrasive material impregnated into the surface of the sidewall within the burnishing region.

Referring to FIGS. 4A-4C, a mandrel 10a is provided that may be used by a tire pre-conditioning system 100a (FIG. 5) in place of the upper mandrel 10 and/or the lower mandrel 10' of FIGS. 2A-3F. In view of the substantial similarity in structure and function of the components associated with the mandrel 10 with respect to the mandrel 10a, like reference numerals are used hereinafter and in the drawings to identify like components while like reference numerals containing letter extensions are used to identify those components that have been modified.

Figure 5:
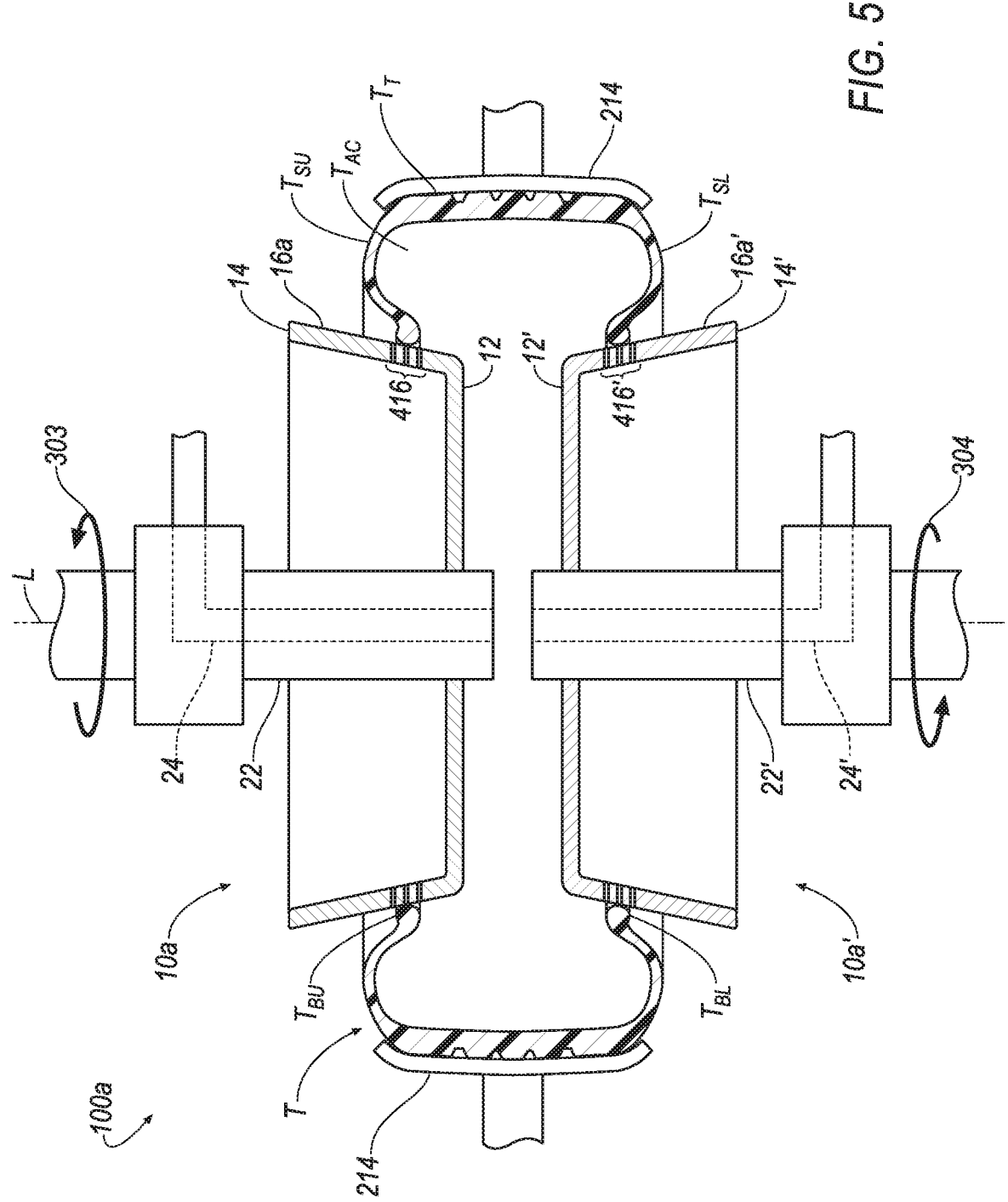
FIG. 5 is an isometric cross-sectional view of a tire pre-conditioning system including a pair of tapered mandrels each including a respective burnishing region for burnishing beads of a tire when the mandrels rotate about a common axis of rotation relative to the tire.

FIG. 4A shows the mandrel 10a including the leading edge 12 having the first radius, the trailing edge 14 having the second radius greater than the first radius, and a tapered sidewall 16a interconnecting the leading edge 12 and the trailing edge 14. As with the mandrel 10 of FIG. 1, the mandrel 10a defines a conical or frusto-conical shape and includes the leading surface 18 having the outer periphery defined by the leading edge 12 and defining the shaft opening 20 for fixedly mounting the mandrel 10 to the rotatable shaft 22 (FIG. 5). The tapered sidewall 16a includes a burnishing region 416 axially disposed between the leading edge 12 and the trailing edge 14 and circumferentially extending around the tapered sidewall 16a. The burnishing region 416 is configured to axially align with the respective upper bead $T_{BU}$ or lower bead $T_{BL}$ of the tire T for removing excess material therefrom when the mandrel 10a rotates relative to the tire T.

Referring to FIG. 4B, a detailed view within circle 4B of FIG. 4A shows the burnishing region 416 defined by a series of apertures 418 formed through the sidewall 16a and including an abrasive material 420 for facilitating the removal of excess material from the respective bead $T_{BU}$, $T_{BL}$. The abrasive material 420 may be impregnated with the material forming the mandrel 10a or may be deposited thereon using any suitable technique.

FIG. 4C provides a cross-sectional view taken along line 4C-4C of FIG. 4B. In some examples, the surface of sidewall 16a within the burnishing region 416 may be roughened to further facilitate the removal of excess material from the tire bead. Accordingly, the surface of the sidewall 16 may be include the abrasive material 420 and/or be roughened for removing excess material from the respective upper bead $T_{BU}$ or lower bead $T_{BL}$ in contact therewith when the mandrel 10a rotates relative to the tire T. Moreover, one or more of the apertures 418 formed through the sidewall 16a may be defined by cambered walls 419 for shaving off the excess material from the tire T. In some examples, the walls 419 may be sharpened. In some examples, one or more of the apertures 418 are defined by straight/perpendicular walls 419 for shaving off the excess material from the tire T.

FIG. 5 provides a tire pre-conditioning system 100a for burnishing the beads $T_{BL}$, $T_{BU}$ of the pneumatic tire T using an upper mandrel 10a and a lower mandrel 10a' each having the burnishing region 416, 416' circumferentially extending around the respective sidewall 16a, 16a'. The example shows the pair of frusto-conical mandrels 10a, 10a' each axially moved toward one another such that the exterior of each sidewall 16a, 16a' is in opposed contact with the respective bead $T_{BU}$, $T_{BL}$ of the tire T. The mandrels 10a, 10a' may be axially displaced so that the burnishing regions 416, 416' are each axially aligned and in opposed contact with the respective bead $T_{BU}$, $T_{BL}$ of the tire T. The tire T has been inflated (e.g., by directing pressurized air via one or both of the slip sleeves 24, 24' into the circumferential air cavity $T_{AC}$) to provide sufficient tension between the each circumferential bead $T_{BU}$, $T_{BL}$ of the tire T and the respective mandrel 10a, 10a' in contact therewith. Accordingly, the upper shaft 22 and upper mandrel 10a fixedly attached thereto may rotate about the longitudinal axis L (e.g., first rotatable direction 303) relative to the tire T to remove excess material from the upper bead $T_{BU}$. Similarly, the lower shaft 22' and lower mandrel 10a' fixedly attached thereto may rotate about the longitudinal axis L (e.g., second rotatable direction 304) relative to the tire T to remove excess material from the lower bead $T_{BL}$.

Figure 6:
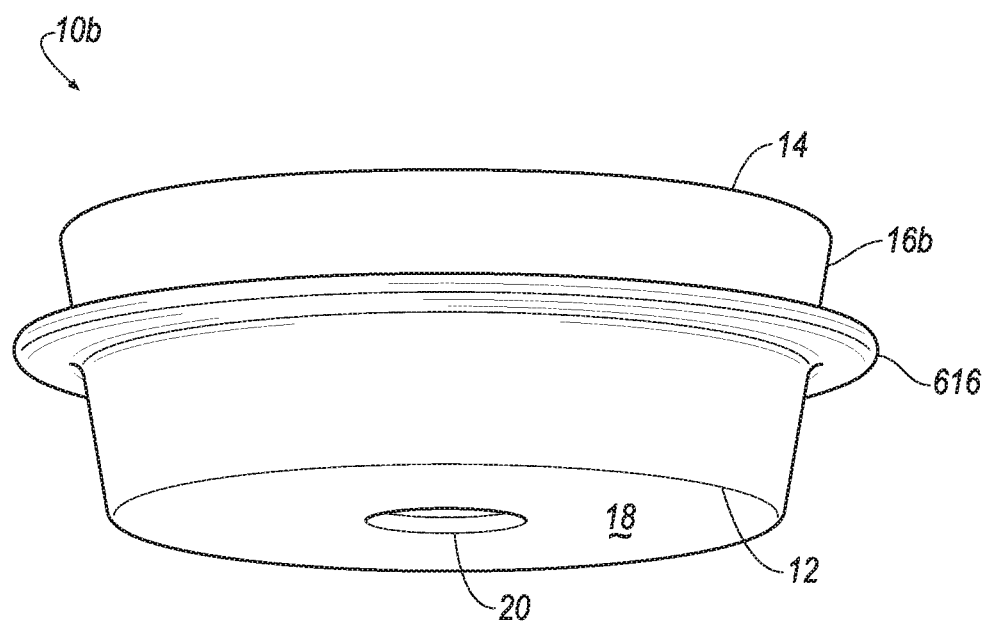
FIG. 6 is an isometric view of an example mandrel including an axial stop protruding radially outward from a tapered sidewall surface of the mandrel and circumferentially extending around the tapered sidewall surface.

Referring to FIG. 6, a mandrel 10b is provided that may be used by a tire pre-conditioning system 100b (FIG. 7) in place of the upper mandrel 10 and/or the lower mandrel 10' of FIGS. 2A-3F. In view of the substantial similarity in structure and function of the components associated with the mandrel 10 with respect to the mandrel 10b, like reference numerals are used hereinafter and in the drawings to identify like components while like reference numerals containing letter extensions are used to identify those components that have been modified.

The mandrel 10b may include the leading edge 12 having the first radius, the trailing edge 14 having the second radius greater than the first radius, and a tapered sidewall 16b interconnecting the leading edge 12 and the trailing edge 14.

Figure 7:
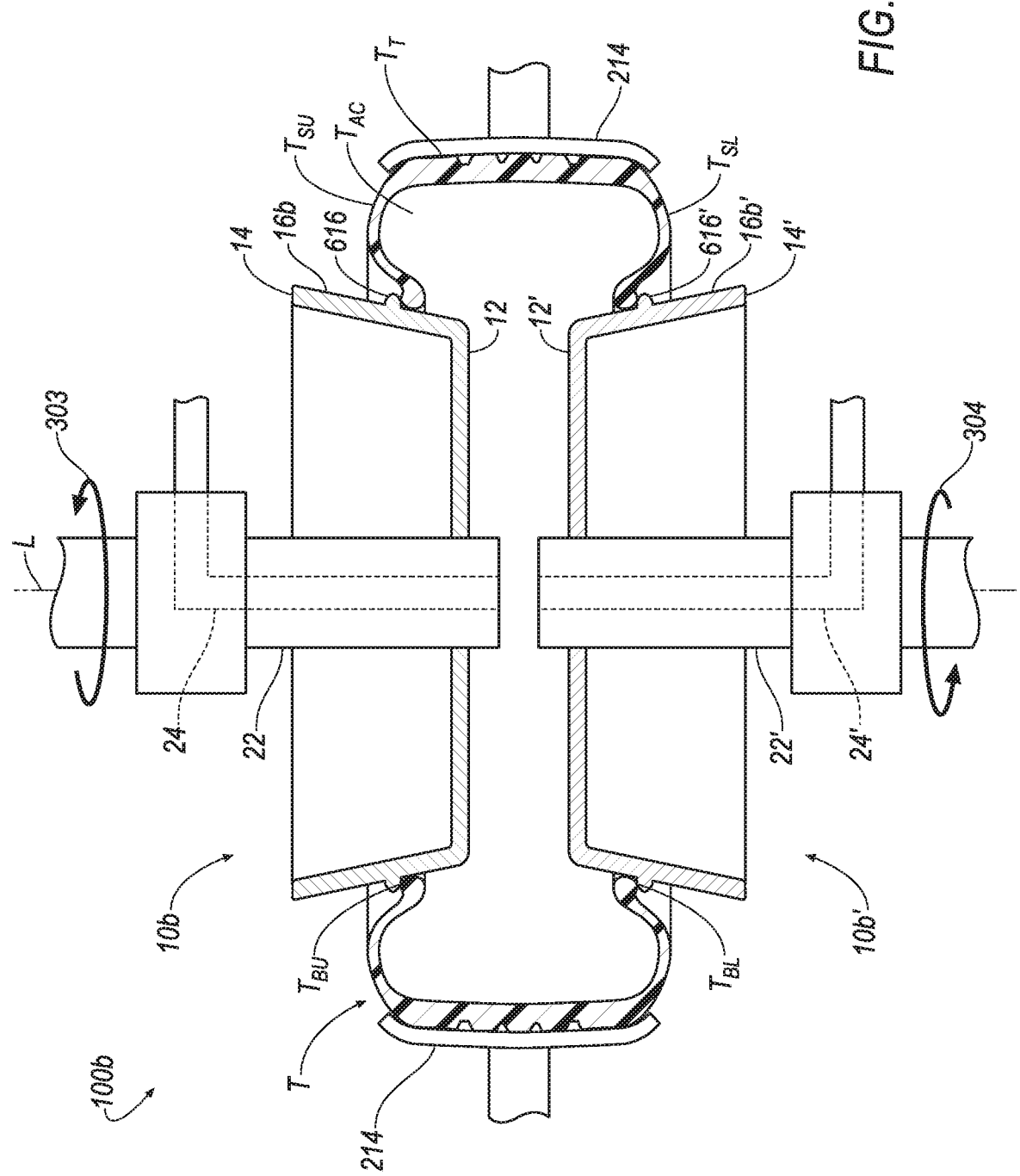
FIG. 7 is an isometric cross-sectional view of a tire pre-conditioning system including a pair of tapered mandrels each including a circumferential axial stop protruding radially outward from a tapered sidewall surface for limiting axial movement of bead surfaces of a tire when a cavity of the tire receives pressurized air.

As with the mandrel 10 of FIG. 1 and the mandrel 10a of FIG. 4A, the mandrel 10b defines a conical or frusto-conical shape and includes the leading surface 18 having the outer periphery defined by the leading edge 12 and defining the shaft opening 20 for fixedly mounting the mandrel 10b to the rotatable shaft 22 (FIG. 7). The tapered sidewall 16b includes an axial stop 616 protruding radially outward from, and circumferentially extending around, the tapered sidewall 16b between the leading edge 12 the trailing edge 14. In some examples, the axial stop 616 is disposed closer to the trailing edge 14 than the leading ledge of the mandrel 10b. The axial stop 616 is configured to limit axial movement of the tire T when the mandrel 10b is in contact with the tire T and the tire T is inflated.

The tapered sidewall 16b, or portion thereof, may be associated with a specific roughness and/or geometry for optimally burnishing the bead $T_{BL}$, $T_{BU}$ (FIG. 7) of the tire T in contact therewith when the mandrel 10b rotates relative to the tire T while contacting the bead surface $T_{BL}$, $T_{BU}$. For instance, the sidewall 16b may be roughened between the axial stop 616 and the leading edge 12 of the mandrel 10b. In some configurations, the mandrel 10b incorporates the burnishing region 416 of the mandrel 10a of FIGS. 4A-4C. For instance, the burnishing region 416 may extend circumferentially around the sidewall 16b between the axial stop 616 and the leading edge 12. A pair of mandrels 10b, 10b' (FIG. 7) may cooperate to burnish respective ones of the circumferential upper bead $T_{BU}$ and the circumferential lower bead $T_{BL}$ of the tire T when each of the mandrels 10b, 10b' rotate relative to the tire while contacting the beads $T_{BL}$, $T_{BU}$.

FIG. 7 provides a tire pre-conditioning system 100b for burnishing the beads $T_{BL}$, $T_{BU}$ of the pneumatic tire T using an upper mandrel 10b and a lower mandrel 10b' each having the axial stop 616 protruding radially outward from, and extending circumferentially around, the respective sidewall 16b, 16a'. The example shows the pair of frusto-conical mandrels 10b, 10b' each axially moved toward one another such that the exterior of each sidewall 16b, 16b' is in opposed contact with the respective bead $T_{BU}$, $T_{BL}$ of the tire T. The tire T has been inflated (e.g., by directing pressurized air via one or both of the slip sleeves 24, 24' into the circumferential air cavity $T_{AC}$) to provide sufficient tension between the each circumferential bead $T_{BU}$, $T_{BL}$ of the tire T and the respective mandrel 10b, 10b' in contact therewith. The upper axial stop 616 is configured to prevent the upper bead $T_{BU}$ from riding up the respective sidewall 16b past a location of the axial stop 616 as the leading edge 12 of the upper mandrel 10b moves axially downward into the circumferential air cavity $T_{AC}$. Similarly, the lower axial stop 616' is configured to prevent the lower bead $T_{BL}$ from riding down the respective sidewall 16b' past a location of the axial stop 616' as the leading edge 12' of the lower mandrel 10b' moves axially upward into the circumferential air cavity $T_{AC}$. Accordingly, the upper shaft 22 and upper mandrel 10b fixedly attached thereto may rotate about the longitudinal axis L (e.g., first rotatable direction 303) relative to the tire T to remove excess material from the upper bead $T_{BU}$. Similarly, the lower shaft 22' and lower mandrel 10b' fixedly attached thereto may rotate about the longitudinal axis L (e.g., second rotatable direction 304) relative to the tire T to remove excess material from the lower bead $T_{BL}$.

In view of the foregoing, the upper and lower mandrels 10, 10' of FIGS. 2A-3F may incorporate the burnishing regions 416, 416' of the mandrels 10a, 10a' of FIGS. 4A-5 and/or the axial stops 616, 616' of the mandrels 10b, 10b' of FIGS. 6 and 7. The tire pre-conditioning system 100, 100a, 100b may be adapted to remove excess material from tires of different sizes and/or different types. Two air pressure sources 206, 206' may be used to decrease the inflation time of the tire T, and hence, decrease the overall time of the burnishing process. However, a single pressure source may be used to inflate the tire. Moreover, the mandrels 10, 10' used by the system 100, 100a, 100b may be interchangeable to accommodate different size/type tires and/or based on burnishing specifications for the given tire.

Figure 8:
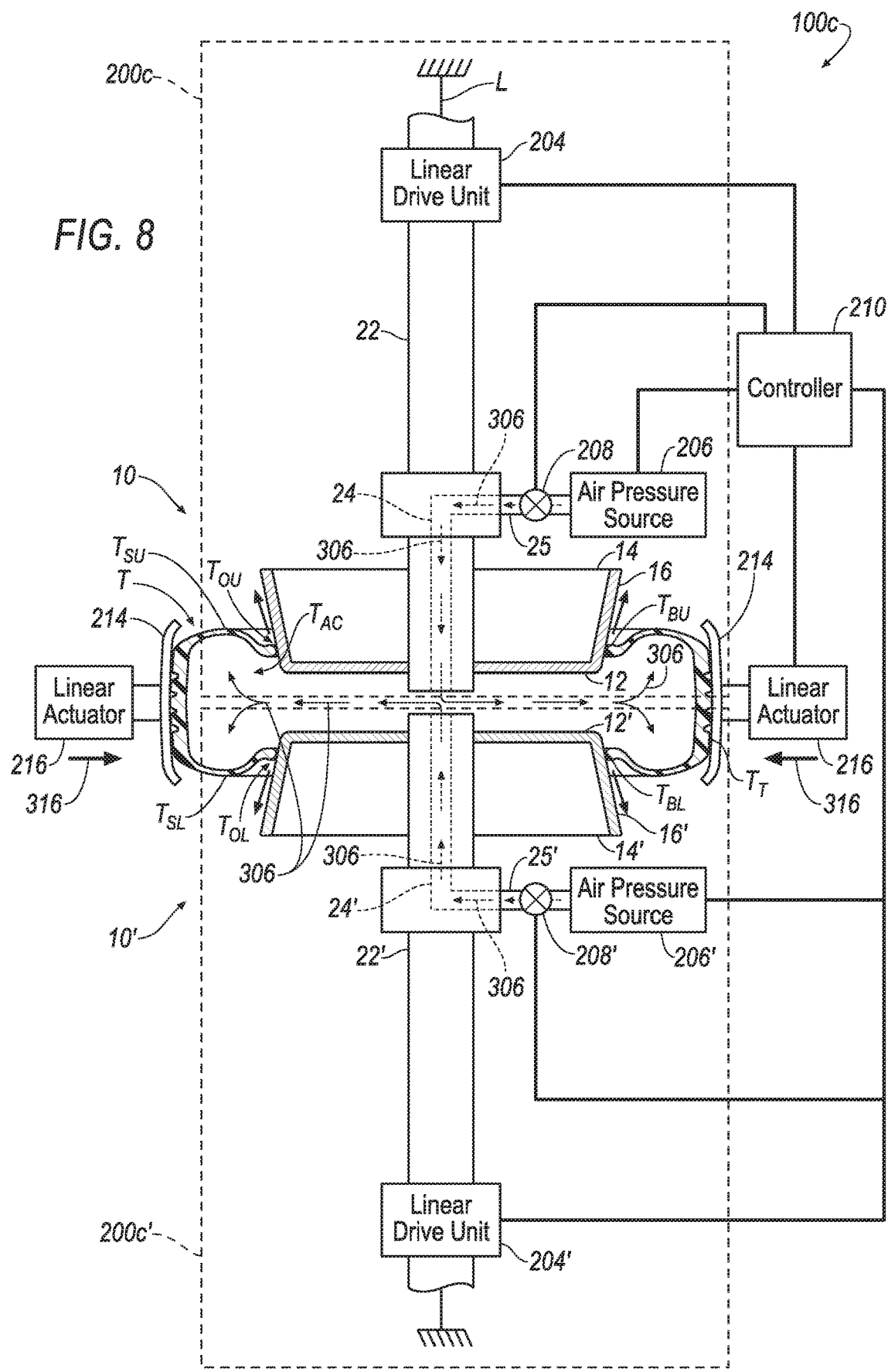
FIG. 8 provides an isometric cross-sectional view of a tire pre-conditioning system including a pair of tapered mandrels axially spaced apart from one another and a pneumatic tire disposed between the tapered mandrels.

FIG. 8 provides a tire pre-conditioning system 100c for burnishing/removing excess material from the upper and lower beads $T_{BU}$, $T_{BL}$ of the tire T without rotating the upper mandrel 10 and the lower mandrel 10' relative to the tire T. In view of the substantial similarity in structure and function of the components associated with the tire pre-conditioning system 100 with respect to the tire pre-conditioning system 100c, like reference numerals are used hereinafter and in the drawings to identify like components while like reference numerals containing letter extensions are used to identify those components that have been modified.

The system 100c may include an upper portion 200c associated with the upper mandrel 10 and a lower portion 200c' associated with the lower mandrel 10'. More specifically, the upper portion 200c and the lower portion 200c' are substantially identical to the upper portion 200 and the lower portion 200', respectively, of the system 100 of FIGS. 3A-3F described above, except that the upper and lower portions 200c, 200c' omit the rotary drive unit 202, 202'. Once the upper bead $T_{BU}$ is in opposed contact with upper sidewall 16 of the upper mandrel 10 and the lower bead $T_{BL}$ is in opposed contact with the lower sidewall 16' of the lower mandrel 10', the circumferential air cavity $T_{AC}$ of the tire T is effectively sealed so that one or both of the air pressure sources 206, 206' may supply pressurized fluid 306 (e.g., air) to the circumferential air cavity $T_{AC}$ to inflate the tire T to a desired pressure. In the alternative, the linear drive units 204, 204' may axially move the mandrels 10, 10' toward the tire T until the sidewalls 16, 16' are opposing and spaced apart from the corresponding beads $T_{BU}$, $T_{BL}$, and the air pressure source(s) 206, 206' rapidly supply pressurized fluid 306 to the air cavity $T_{AC}$ to cause the beads $T_{BU}$, $T_{BL}$ to expand into contact with the corresponding sidewalls 16, 16', and thereby effectively seal the circumferential air cavity $T_{AC}$ of the tire T while the tire T inflates to the desired pressure.

As the pressurized fluid 306 inflates the tire T, the upper bead $T_{BU}$ moves axially upward relative to the upper mandrel 10 while contacting the upper sidewall 16 thereof and the lower bead $T_{BL}$ moves axially downward relative to the lower mandrel 10' while contacting the lower sidewall 16' thereof. Here, the riding of the beads $T_{BU}$, $T_{BL}$ against their corresponding sidewalls 16, 16 is sufficient to burnish/remove excess material from the upper and lower beads $T_{BU}$, $T_{BL}$ of the tire T without rotating the upper mandrel 10 and the lower mandrel 10' relative to the tire T. The upper and lower mandrels 10, 10' may incorporate the burnishing regions 416, 416' of the mandrels 10a, 10a' of FIGS. 4A-5 and/or the axial stops 616, 616' of the mandrels 10b, 10b' of FIGS. 6 and 7. The tire pre-conditioning system 100c may be adapted to remove excess material from tires of different sizes and/or different types. Two air pressure sources 206, 206' may be used to decrease the inflation time of the tire T, and hence, decrease the overall time of the burnishing process. However, a single pressure source may be used to inflate the tire. Moreover, the mandrels 10, 10' used by the system 100c may be interchangeable to accommodate different size/type tires and/or based on burnishing specifications for the given tire.

A number of implementations have been described. Nevertheless, it will be understood that various modifications may be made without departing from the spirit and scope of the disclosure. Accordingly, other implementations are within the scope of the following claims.

What is claimed is:

1. A tire pre-conditioning system comprising:
   a first mandrel attached to a first shaft, the first mandrel including a first sidewall;
   a second mandrel attached to a second shaft, the second mandrel including a second sidewall; and
   a controller in communication with the first mandrel and the second mandrel, the controller operable to:
   move the first mandrel and the second mandrel toward one another until the first sidewall of the first mandrel is opposing a first bead of a tire and the second sidewall of the second mandrel is opposing a second bead of the tire, and
   supply pressurized fluid into an internal cavity of the tire for causing the first bead to move relative to the first mandrel while contacting the first sidewall to burnish the first bead of the tire, and the second bead to move relative to the second mandrel while contacting the second sidewall to burnish the second bead of the tire.

2. The tire pre-conditioning system of claim 1, further comprising:
   a first linear actuator in communication with the controller and the first shaft, the first linear actuator configured to axially move the first shaft in a first direction toward the second shaft and a second direction away from the second shaft;
   a first rotary drive unit in communication with the controller and the first shaft, the first rotary drive unit configured to rotate the first shaft about a longitudinal axis defined by the first shaft and the second shaft;
   a second linear actuator in communication with the controller and the second shaft, the second linear actuator configured to axially move the second shaft in the second direction toward the first shaft and the first direction away from the first shaft; and
   a second rotary drive unit in communication with the controller and the second shaft, the second rotary drive unit configured to rotate the second shaft about the longitudinal axis.

3. The tire pre-conditioning system of claim 1, further comprising:
   a first air pressure source in communication with the controller, the first air pressure source configured to supply the pressurized fluid to the internal cavity of the tire to inflate the tire when the first sidewall is in opposed contact with the first bead and the second sidewall is in opposed contact with the second bead.

4. The tire pre-conditioning system of claim 3, wherein the first shaft defines a first slip sleeve configured to direct the pressurized air from the first air pressure source to the internal cavity of the tire.

5. The tire pre-conditioning system of claim 3, further comprising:
   a second air pressure source in communication with the controller, the second air pressure source configured to supply the pressurized fluid to the internal cavity of the tire to inflate the tire when the first sidewall is in opposed contact with the first bead and the second sidewall is in opposed contact with the second bead, wherein the first air pressure source and the second air pressure source supply the pressurized fluid to the internal cavity of the tire concurrently.

6. The tire pre-conditioning system of claim 5, wherein the second shaft defines a second slip sleeve configured to direct the pressurized air from the second air pressure source to the internal cavity of the tire.

7. The tire pre-conditioning system of claim 1, wherein at least a portion of the first sidewall and the second sidewall includes abrasive materials.

8. The tire pre-conditioning system of claim 7, wherein the abrasive materials are impregnated within the first sidewall and the second sidewall.

9. The tire pre-conditioning system of claim 1, wherein an exterior surface of at least one of the first sidewall and the second sidewall is roughened.

10. The tire pre-conditioning system of claim 1, wherein at least one of the first sidewall and the second sidewall includes a circumferential burnishing region defined by a series of apertures formed through the at least one of the first sidewall and the second sidewall.

11. The tire pre-conditioning system of claim 10, wherein one or more apertures of the series of apertures are defined by cambered walls configured to shave off excess tire material.

12. The tire pre-conditioning system of claim 1, further comprising:
a circumferential axial stop radially protruding from at least one of the first sidewall and the second sidewall, the axial stop configured to limit axial movement of the tire when the first sidewall is in opposed contact with the first bead of the tire and the second sidewall of the second mandrel is in opposed contact with the second bead of the tire.

13. A pre-conditioning system for conditioning a tire, the system comprising:
a first bead-burnishing mandrel attached to a first shaft;
a second bead-burnishing mandrel attached to a second shaft;
an air pressure source in fluid communication with an internal cavity of the tire; and
a controller in communication with the first mandrel, the second mandrel and the air pressure source, the controller operable to:
arrange the first mandrel adjacent a first bead of the tire and the second mandrel adjacent a second bead of the tire; and
direct pressurized fluid from the air pressure source into the internal cavity of the tire for causing:
the first bead to move while contacting the first bead-burnishing mandrel, and
the second bead to move while contacting the second bead-burnishing mandrel.

14. The pre-conditioning system of claim 13, further comprising:
a first linear actuator in communication with the controller and the first shaft, the first linear actuator configured to axially move the first shaft in a first direction toward the second shaft and a second direction away from the second shaft;
a first rotary drive unit in communication with the controller and the first shaft, the first rotary drive unit configured to rotate the first shaft about a longitudinal axis defined by the first shaft and the second shaft;
a second linear actuator in communication with the controller and the second shaft, the second linear actuator configured to axially move the second shaft in the second direction toward the first shaft and the first direction away from the first shaft; and
a second rotary drive unit in communication with the controller and the second shaft, the second rotary drive unit configured to rotate the second shaft about the longitudinal axis.

15. The pre-conditioning system of claim 13, wherein the air pressure source includes:
a first air pressure source in communication with the controller, the first air pressure source configured to supply the pressurized fluid to the internal cavity of the tire to inflate the tire when the first bead-burnishing mandrel is in opposed contact with the first bead and the second bead-burnishing mandrel is in opposed contact with the second bead.

16. The pre-conditioning system of claim 15, wherein the first shaft defines a first slip sleeve configured to direct the pressurized air from the first air pressure source to the internal cavity of the tire.

17. The pre-conditioning system of claim 15, wherein the air pressure source includes:
a second air pressure source in communication with the controller, the second air pressure source configured to supply the pressurized fluid to the internal cavity of the tire to inflate the tire when the first bead-burnishing mandrel is in opposed contact with the first bead and the second bead-burnishing mandrel is in opposed contact with the second bead,
wherein the first air pressure source and the second air pressure source supply the pressurized fluid to the internal cavity of the tire concurrently.

18. The pre-conditioning system of claim 17, wherein the second shaft defines a second slip sleeve configured to direct the pressurized air from the second air pressure source to the internal cavity of the tire.

19. The pre-conditioning system of claim 13, wherein at least a portion of the first bead-burnishing mandrel and the second bead-burnishing mandrel includes abrasive materials.

20. The pre-conditioning system of claim 19, wherein the abrasive materials are impregnated within the first bead-burnishing mandrel and the second bead-burnishing mandrel.

21. The pre-conditioning system of claim 13, wherein an exterior surface of at least one of the first bead-burnishing mandrel and the second bead-burnishing mandrel is roughened.

22. The pre-conditioning system of claim 13, wherein at least one of the first bead-burnishing mandrel and the second bead-burnishing mandrel includes a circumferential burnishing region defined by a series of apertures formed through the at least one of the first bead-burnishing mandrel and the second bead-burnishing mandrel.

23. The pre-conditioning system of claim 22, wherein one or more apertures of the series of apertures are defined by cambered walls configured to shave off excess tire material.

24. The pre-conditioning system of claim 13, further comprising:
a circumferential axial stop radially protruding from at least one of the first bead-burnishing mandrel and the second bead-burnishing mandrel, the axial stop configured to limit axial movement of the tire when the first bead-burnishing mandrel is in opposed contact with the first bead of the tire and the second bead-burnishing mandrel of the second mandrel is in opposed contact with the second bead of the tire.

\* \* \* \* \*